E. N. MOOR.
INDEPENDENT FEED SCREW DRIVE FOR LATHES.
APPLICATION FILED AUG. 30, 1915.

1,188,006.

Patented June 20, 1916.

WITNESS
Wm. F. Drew.

INVENTOR
Edward N. Moor
BY
Wm. F. Booth
ATTORNEY

UNITED STATES PATENT OFFICE.

EDWARD N. MOOR, OF OAKLAND, CALIFORNIA.

INDEPENDENT FEED-SCREW DRIVE FOR LATHES.

1,188,006.   Specification of Letters Patent.   Patented June 20, 1916.

Application filed August 30, 1915.   Serial No. 47,982.

*To all whom it may concern:*

Be it known that I, EDWARD N. MOOR, a citizen of the United States, residing at Oakland, in the county of Alameda and State of California, have invented certain new and useful Improvements in Independent Feed-Screw Drives for Lathes, of which the following is a specification.

My invention relates to an auxiliary mechanism for driving the feed screw of a horizontal lathe independently of the lathe spindle.

It is sometimes necessary that the feed screw of a lathe be driven while the spindle carrying the chuck or face-plate is held stationary, as, for example, when a milling or grinding attachment is used upon the lathe bed, and the cutting member thereof fed into the work, either longitudinally or transversely, or both, by means of the usual lathe feed screw. This cannot be done on the ordinary type of lathe as at present constructed, for the reason that the feed screw is driven from the lathe spindle, and hence cannot be operated except by the rotation of said spindle.

The object of my invention, therefore, is to provide a means for driving the feed screw while the spindle is held stationary, particularly with a view to rendering more practicable the operation of the traverse grinding, milling and drilling machines for lathes, for which United States Letters Patent Nos. 1073698 and 1112716, were issued to me on September 23, 1913 and October 6, 1914 respectively.

To this end my invention consists in the novel device hereinafter described with reference to the accompanying drawings, in which—

Figure 1:
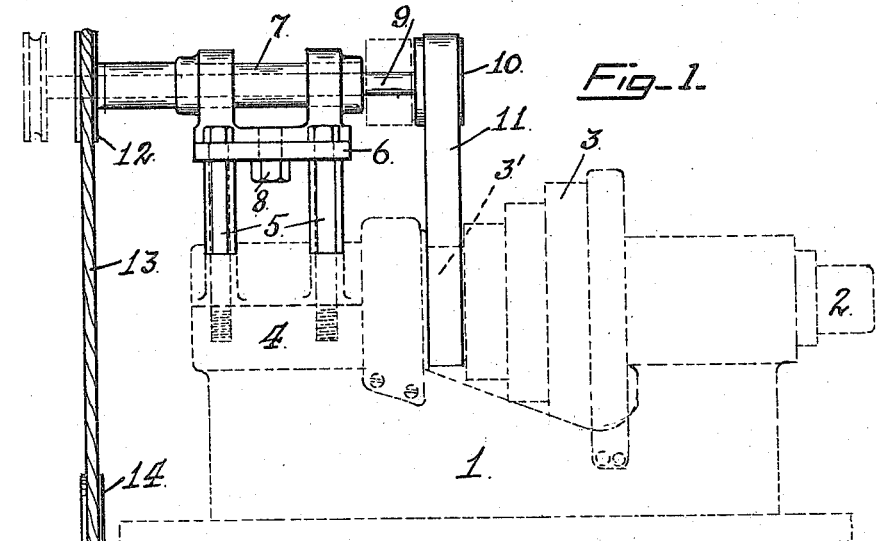
Figure 2:
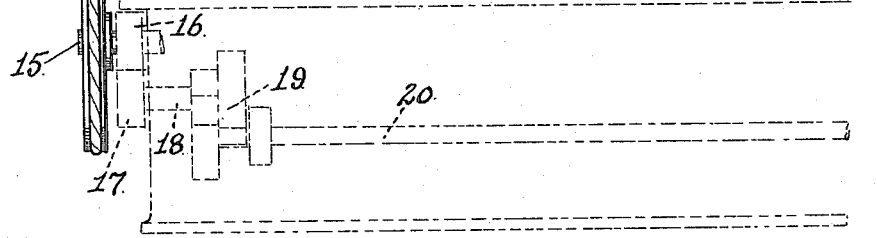
Figure 3:
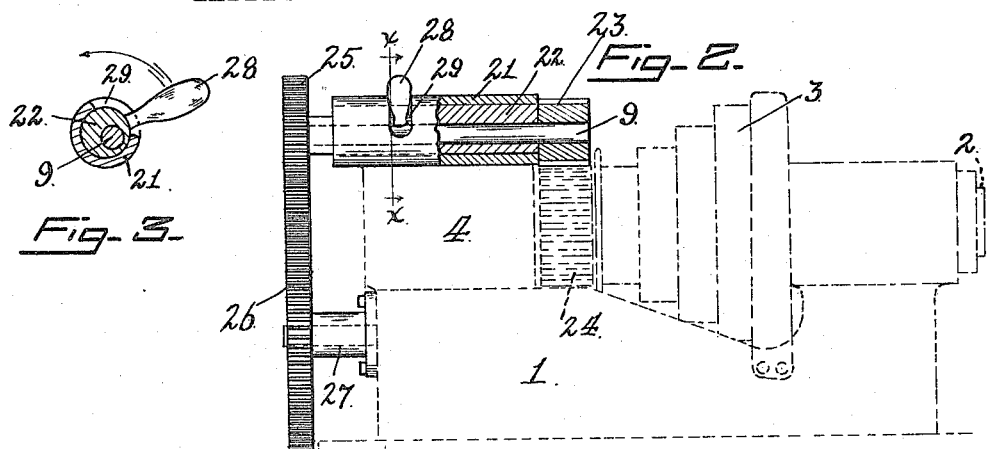

Figure 1 is a side elevation of my device applied to a horizontal lathe of the usual type. Fig. 2 is a part-sectional elevation of a modified form of my device. Fig. 3 is a transverse section on the line $x$—$x$ of Fig. 2, viewed in the direction of the arrows.

In the drawings, the numeral 1 represents the head-stock of a horizontal lathe of the usual type, having a spindle 2 and a stepped cone pulley 3 rotatably mounted thereon, and connected for the transmission of power thereto by well known means not necessary to show in the drawings. Fixed to the end bearing support 4 of the head stock 1, by means of screws 5, is a suitably formed spacing member 6, upon which is mounted a journal bracket 7, fastened to said spacing member 6 by any convenient means, shown in Fig. 1 as a screw 8.

A horizontal shaft 9 is rotatably and slidably mounted in said journal bracket 7 parallel to the lathe spindle 2, and carries at its inner end a pulley 10. A belt 11, passing over said pulley 10 and one of the steps 3' of the cone pulley 3, drives said horizontal shaft 9, it being understood that the cone pulley 3 is driven by the usual lathe belt, not shown in the drawings.

On the opposite, or outer end of the shaft 9, is another pulley 12 which is connected by a belt 13 to a pulley 14. This pulley 14 is connected by any suitable means, as, for example, a short shaft 15, gears indicated at 16 and 17, and short-shaft 18, to the usual reversing and speed changing gearing 19 for the feed screw 20.

In using the herein described device, the means, not herein shown, connecting the cone pulley 3 with the spindle 2, are first thrown out of engagement, thus rendering said cone pulley independent of said spindle, so that the spindle may be held stationary, if desired. The feed screw 20 is then driven by means of the described device, it being understood that the usual feed screw driving mechanism, not shown in the drawings, has been thrown out of engagement.

When it is desired to return the lathe to its normal condition, the belts 11 and 13 are removed, and the shaft 9 is moved longitudinally in its journals into the position indicated by dotted lines in Fig. 1, so that the pulley 10 is entirely out of the path of the regular lathe driving belt, not shown in the drawings.

A modified form of my independent feed screw drive is illustrated in Fig. 2. In this form a sleeve 21 is constructed preferably integral with the outer bearing support 4 of the head-stock 1.

Mounted for partial rotation within said sleeve 21 is an eccentric bushing 22. Journaled within this eccentric bushing 22 is the shaft 9, which carries at its inner end a gear 23 adapted to mesh with the usual gear 24 fixed to the cone pulley 3. The outer end of the shaft 9 carries a gear 25, which meshes with an idler gear 26 supported by a bracket 27, and this idler 26 in turn is connected with the usual feed screw reversing and speed-changing mechanism 19, by any suitable means, as, for example, a pair of co-acting gears indicated at 16 and 17, and short-shaft 18.

A lever 28, fixed to the eccentric bushing 22, projects through a slot 29 in the sleeve 21, and by means of said lever 28 the eccentric bushing may be rotated to raise the shaft 9 to throw the gears 23 and 25 out of engagement with their respectively co-acting gears 24 and 26. The operation of this form of the device is similar to that of the form described in connection with Fig. 1, except that in the modified form the power is transmitted from the cone pulley 3 to the feed screw 20 through gears instead of through pulleys and belts.

It will be observed that the form of my device shown in Fig. 1, and described with reference thereto, is readily applicable to any existing lathe of the usual horizontal type. The modified form illustrated in Fig. 2, however, is intended to be incorporated in the lathe when the same is constructed, but the essential principles of the invention are the same in both forms. In like manner, other changes may be made in the form and construction of my device without affecting the principles of the invention, and I therefore do not wish to be construed as limiting myself in this regard.

I claim:—

1. An independent feed-screw drive for lathes comprising a shaft; a bracket in which said shaft is rotatably mounted; means for mounting said bracket upon the head-stock of the lathe; means for driving said shaft from the cone-pulley of the lathe; means for driving the feed-screw of the lathe from said shaft; and means for changing the position of said shaft to throw it into or out of driven relation with the cone-pulley, at will.

2. An independent feed-screw drive for lathes comprising a shaft; means for rotatably mounting said shaft upon the head-stock of the lathe; means for driving said shaft from the cone-pulley of the lathe; means for driving the feed-screw of the lathe from said shaft; and means for changing the position of said shaft to throw it into or out of driven relation with the cone-pulley, at will.

3. An independent feed-screw drive for lathes comprising a shaft; a bracket in which said shaft is rotatably and slidably mounted; means for supporting said bracket from the head-stock of the lathe; means for driving said shaft from the cone-pulley of the lathe; and means for driving the feed-screw of the lathe from said shaft.

4. An independent feed-screw drive for lathes comprising a shaft; a bracket in which said shaft is rotatably and slidably mounted; means for supporting said bracket from the head-stock of the lathe; a pulley and belt connection for driving said shaft from the cone-pulley of the lathe; and a pulley and belt connection for driving the feed-screw of the lathe from said shaft.

In testimony whereof I have signed my name to this specification in the presence of two subscribing witnesses.

EDWARD N. MOOR.

Witnesses:
WM. F. BOOTH,
D. B. RICHARDS.

Copies of this patent may be obtained for five cents each, by addressing the "Commissioner of Patents, Washington, D. C."